United States Patent [19]

Harper

[11] Patent Number: 4,843,054

[45] Date of Patent: Jun. 27, 1989

[54] PREPARATION OF FILTERABLE DOUBLE METAL CYANIDE COMPLEX CATALYST FOR PROPYLENE OXIDE POLYMERIZATION

[75] Inventor: Stephen D. Harper, West Chester, Pa.

[73] Assignee: Arco Chemical Technology, Inc., Wilmington, Del.

[21] Appl. No.: 231,619

[22] Filed: Aug. 8, 1988

Related U.S. Application Data

[63] Continuation of Ser. No. 19,386, Feb. 26, 1987, abandoned.

[51] Int. Cl.$^4$ .............................................. B01J 27/26
[52] U.S. Cl. ..................................... 502/175; 502/200
[58] Field of Search ................................ 502/175, 200

[56] References Cited

U.S. PATENT DOCUMENTS

| | | | |
|---|---|---|---|
| 3,278,459 | 10/1966 | Herold | 502/153 X |
| 3,427,256 | 2/1969 | Milgrom | 502/167 |
| 3,427,334 | 2/1969 | Belner | 502/172 X |
| 3,829,505 | 8/1974 | Herold | 502/175 X |
| 3,941,849 | 3/1976 | Herold | 528/92 |
| 4,394,298 | 7/1983 | Nowack et al. | 502/200 |
| 4,477,589 | 10/1984 | van der Hulst et al. | 502/167 X |
| 4,721,818 | 1/1988 | Harper et al. | 568/620 |

OTHER PUBLICATIONS

Rideal, E. K., *Concepts in Catalysis*, Academic Press, N.Y., 1968, p. 5.

*Primary Examiner*—Patrick P. Garvin
*Assistant Examiner*—George R. Fourson
*Attorney, Agent, or Firm*—Dennis M. Kozak; Stephen D. Harper

[57] ABSTRACT

The reaction products of metal salts and alkali metal cyanometallates are not easily separated because the particle size of the metallate is too small to allow filtration under normal conditions. Centrifugation, dialysis, or conversion to a filterable metal hydroxide salt are the methods previously described for separating the alkali metal salt formed during reaction from the catalyst. Reaction in the presence of an inert filter-aid has been found to give a filterable catalyst which can be washed clean of the alkali metal salt.

15 Claims, No Drawings

4,843,054

PREPARATION OF FILTERABLE DOUBLE METAL CYANIDE COMPLEX CATALYST FOR PROPYLENE OXIDE POLYMERIZATION

This is a continuation of co-pending application Ser. No. 019,386 filed on Feb. 26, 1987, now abandoned.

BACKGROUND OF THE INVENTION

This invention relates to a process for the preparation of catalysts of the double metal cyanide complex class.

The preparation of double metal cyanide complex catalysts, e.g., a metal hexacyanometallate catalyst which is useful for alkylene oxide polymerization, from a metal salt and an alkali metal hexacyanometallate requires the removal of the alkali metal halide formed during the reaction. Due to the small particle size of the metal hexacyanometallate, filtration is not practical. Centrifugation, dialysis, or conversion to a filterable metal hydroxide salt are the methods which have been described previously in the literature. Various methods have been outlined in U.S. Pat. Nos. 3,427,256; 3,941,849; 4,472,560; and 4,477,589. The teachings of these patents are incorporated herein by reference. These prior art methods require sophisticated equipment to achieve separation. The present invention provides a method which facilitates the use of filtration to prepare double metal cyanide complex catalysts.

SUMMARY OF THE INVENTION

According to this invention, there is provided a process for preparing a double metal cyanide complex catalyst which comprises:

(a) reacting in a liquid medium at least one metal salt selected from the group consisting of the salts of Zn(II), Fe(II), Fe(III), Co(II), Ni(II), Mo(IV), Mo(VI), Al(III), V(IV), V(V), Sr(II), W(IV), W(VI), Mn(II), and Cr(III), with at least one alkali metal cyanometallate selected from the group consisting of the metallates of Fe(II), Fe(III), Co(II), Co(III), Cr(III), Mn(II), Mn(III), V(IV), and V(V), in the presence of from about 0.01 to about 100 times the total weight of the metal salt and the alkali metal cyanometallate of filter-aid particles to form a slurry of double metal cyanide complex catalyst and filter-aid particles dispersed in the liquid medium which has dissolved therein alkali metal salt formed during the reaction; and (b) recovering the double metal cyanide complex catalyst and filter-aid particles from the liquid medium.

DETAILED DESCRIPTION OF THE INVENTION

As used herein, the term "filter-aid" means any inert, insoluble substance which is sufficiently porous to allow passage of water and other liquids of similar viscosity while retaining foreign particles on the surface of the filter-aid. In the practice of this invention, it is preferred that the filter-aid have a relatively narrow particle size distribution of approximately 100–200 mesh to permit rapid filtration and washing of the catalyst slurry while retaining the double metal cyanide catalyst in the filter cake. It is also preferred that the filter-aid have a low density so that it forms a relatively uniform filter cake when mixed with the catalyst, which tends to settle fairly slowly out of the liquid medium. Any suitable filter-aid may be employed. Suitable filter-aids include alumina, silica gel, silica, aluminum silicate, magnesium silicate, diatomaceous earth, perlite, carbon black, charcoal, and the like, and their mixtures. Commercial materials found useful include Aldrich activated neutral alumina, United Catalysts SAHY-99 alumina, Exolon WP 150 mesh -alumina, Davison Grade 952 silica gel, and Celite diatomaceous earth.

In a preferred embodiment of this invention, the metal salt reacted with the alkali metal cyanometallate is a metal halide, metal sulfate, or metal nitrate. Metal halides are preferred, particularly metal chlorides.

In another preferred embodiment, the alkali metal of the alkali metal cyanometallate is lithium, sodium, or potassium.

In yet another embodiment of the invention, the filter-aid may be added to the reaction mixture after the catalyst has been prepared by before the separation of the catalyst from the liquid medium.

In the process of the invention, catalysts have been prepared by addition of a dilute aqueous solution of alkali metal cyanometallate to an aqueous slurry of filter-aid and metal salt. The resulting mixture is then treated with glyme and collected by filtration in a fritted glass filter funnel. The filter cake is washed with aqueous glyme to remove the alkali metal salt formed as a byproduct. The filter cake is then dried under vacuum and crushed to yield the final catalyst containing the filter-aid and alkali metal cyanometallate.

If isolation of the catalyst is attempted in the absence of inert filter-aid, the time required to filter and wash the catalyst is much longer since filter beds which are able to retain very small particles generally exhibit slower flow rates. In addition, the filter cakes formed by double metal cyanide catalysts tend to have low porosity due to fine particle size.

Any suitable liquid medium for the reaction of the metal salt and alkali metal cyanometallate can be employed. Suitable liquid medium is water and any of the ethers generally known to be useful in these reactions, such as tetrahydrofuran, dimethoxyethane(glyme), and ketones, such as acetone, and their mixtures.

The amounts of metal salt and alkali metal cyanometallate used are determined by the desired composition of the final active catalyst. Typically, a 50% molar excess of metal salt is used. The amount of filter-aid required varies depending on its density, surface area, and particle size, but typically is 0.01 to 100 times the total weight of the metal salt plus the alkali metal cyanometallate.

Catalysts prepared according to this invention may be used for the preparation of propylene oxide polyols in exactly the same manner as catalysts prepared by previously known methods. The amount of catalyst employed must be adjusted to compensate for the inert filter-aid present.

The present invention is further illustrated by the following examples, wherein parts and percentages are by weight, unless otherwise indicated.

EXAMPLE 1

(a) Catalyst Preparation

A solution of 4.15 g (12.5 mmole) potassium hexacyanocobaltate in 100 ml water was added slowly with mixing to a mixture of 3.82 g (28.0 mmole) zinc chloride and 25.0 g 100–200 mesh alumina (United Catalysts SAHT-99) in 40 ml water. After addition was completed, 25 ml glyme were added, and the mixture stirred for one hour. The catalyst was collected by filtration in a 6.5 cm diameter fritted filter funnel, washed 3 times with 70 ml 30% glyme and twice with 70 ml 90% glyme. Filtration required about 50 minutes and the filtrate was only slightly cloudy. The filter cake was air-dried, crushed, and dried 18 hours at 0.1 mm pressure (25° C.) to yield 29.85 g powder containing 1.3% Co, 3.1% Zn, and 0.012% K.

(b) Polymerization

A one-liter stirred autoclave was charged with 2.23 g catalyst from (a) above, 21.5 g propoxylated trimethylolpropane (470 MW), 110 ml of tetrahydrofuran, and 32 g propylene oxide (PO). A pressure drop was observed shortly after heating the mixture to 90° C. Another 523 g of PO was added over 6 hours. The analytical data obtained for the final product after removal of solvent are shown in Table I.

COMPARATIVE EXAMPLE 2

(a) Catalyst Preparation

A solution of 134.46 g (405 mmole) potassium hexacyanocobaltate in 3240 ml water was added slowly with mixing to 123.77 g (908 mmole) zinc chloride in 975 ml water. After addition was completed (2.5 hours), 820 ml glyme were added, and the mixture stirred for 3 more hours. The precipitate was collected by centrifugation in 4 one-liter bottles, washed 3 times with 2260 ml (total) 30% glyme, and twice with 2260 ml 90% glyme. The catalyst was re-suspended in each wash before centrifugation. After drying 4 days in a vacuum oven under a nitrogen purge (25° C.), the catalyst was crushed to a fine powder and dried 5 hours at 0.1 mm pressure to yield 185.15 g product containing 24.5% C, 2.7% H, 16.2% N, 23% Zn, 11% Co, and 0.12% K.

(b) Polymerization

A one-liter autoclave was charged with 0.30 g catalyst from Comparative Example II(a), 21.5 propoxylated trimethylolpropane (470 MW), and 145 ml tetrahydrofuran. A pressure drop was observed 15 minutes after adding 39 g PO at 90° C. Another 503 g PO was added over 9 hours.

TABLE I

|  | Example 1 | Example 2 |
| --- | --- | --- |
| $M_n$, Calc. | 12,500 | 12,300 |
| $M_n$, GPC | 11,000 | 11,500 |
| Polydispersity | 1.76 | 1.71 |
| HO No. | 15 | 16 |
| $M_n$, HO No. | 11,200 | 10,300 |
| Unsatn., Meq/g | 0.008 | 0.008 |
| Viscosity, 25° C., cps | 5300 | 5890 |

From property comparison in Table I, it is shown that comparable catalyst was prepared in both Examples. However, the method of Example 1 required only filtration of the zinc hexacyanocobaltate with the aid of an inert filter-aid, whereas the method of Example 2 required elaborate centrifugation processes and equipment.

What is claimed is:

1. A process for preparing unsupported double metal cyanide complex catalyst particles suitable for use to polymerize epoxides which consists essentially of:
    (a) reacting in a liquid medium at least one Zn(II) metal salt with at least one alkali metal hexacyanometallate selected from the group consisting of the metallates of Fe(II), Fe(III), Co(II), and Co(III) to form the unsupported double metal cyanide complex catalyst particles and at least one soluble alkali metal salt;
    (b) adding to or carrying out reaction (a) in the presence of about 0.01 to about 100 times the total weight of the Zn(II) metal salt plus alkali metal hexacyanometallate of inert filter-aid particles to form a mixture of unsupported double metal cyanide complex catalyst and filter-aid particles dispersed in the liquid medium which has dissolved therein the soluble alkali metal salt formed during reaction (a);
    (c) separating the mixture of unsupported double metal cyanide complex catalyst and filter-aid particles from the liquid medium containing the soluble alkali metal salt by filtration, whereby the use of the filter-aid particles reduces the filtration time required to separate the unsupported double metal cyanide complex catalyst particles from the liquid medium as compared to the time required in the absence of the filter-aid particles; and
    (d) drying the mixture in a vacuum or a stream of inert gas or air at a temperature of less than about 100° C.
2. A process of claim 1 wherein said filter-aid is alumina.
3. A process of claim 1 wherein said filter-aid is silica gel.
4. A process of claim 1 wherein said filter-aid is diatomaceous earth.
5. A process of claim 1 wherein said filter-aid is silica.
6. A process of claim 1 wherein said filter-aid is aluminum silicate.
7. A process of claim 1 wherein said filter-aid is magnesium silicate.
8. A process of claim 1 wherein said filter-aid is perlite.
9. A process of claim 1 wherein said filter-aid is carbon black.
10. A process of claim 1 wherein said filter-aid is charcoal.
11. A process of claim 1 wherein said liquid medium is aqueous glyme.
12. A process of claim 1 wherein said alkali metal of the alkali metal hexacyanometallate is sodium.
13. A process of claim 1 wherein said alkali metal of the alkali metal hexacyanometallate is potassium.
14. A process of claim 1 wherein said hexacyanometallate of said alkali metal hexacyanometallate is hexacyanocobaltate.
15. A process of claim 1 wherein said hexacyanometallate of said alkali metal hexacyanometallate is hexacyanoferrate.

* * * * *